United States Patent
Fang et al.

(10) Patent No.: US 10,757,584 B1
(45) Date of Patent: Aug. 25, 2020

(54) USE OF DIFFERENT CO-EXISTING TDD CONFIGURATIONS ON A TDD CARRIER, WITH UPLINK BEAMFORMING TO HELP MINIMIZE INTERFERENCE

(71) Applicant: Sprint Spectrum L.P., Overland Park, KS (US)

(72) Inventors: Zheng Fang, Mclean, VA (US); David Z. Sun, Broadlands, VA (US); Yu Wang, Fairfax, VA (US); Zheng Cai, Fairfax, VA (US)

(73) Assignee: Sprint Spectrum L.P., Overland Park, KS (US)

(*) Notice: Subject to any disclaimer, the term of this patent is extended or adjusted under 35 U.S.C. 154(b) by 0 days.

(21) Appl. No.: 16/392,045

(22) Filed: Apr. 23, 2019

(51) Int. Cl.
*H04W 16/28* (2009.01)
*H04W 16/14* (2009.01)
*H04W 88/08* (2009.01)

(52) U.S. Cl.
CPC .......... *H04W 16/28* (2013.01); *H04W 16/14* (2013.01); *H04W 88/08* (2013.01)

(58) Field of Classification Search
CPC ...... H04W 16/28; H04W 16/14; H04W 88/08
See application file for complete search history.

(56) References Cited

U.S. PATENT DOCUMENTS

| | | | |
|---|---|---|---|
| 2013/0272170 A1* | 10/2013 | Chatterjee | H04W 28/08 370/280 |
| 2014/0092785 A1* | 4/2014 | Song | H04W 28/0278 370/280 |
| 2015/0256320 A1 | 9/2015 | Feng | |
| 2015/0282246 A1* | 10/2015 | Teyeb | H04W 36/0072 370/312 |
| 2015/0365957 A1* | 12/2015 | Zhu | H04W 24/04 370/280 |
| 2016/0183232 A1* | 6/2016 | Stirling-Gallacher | H04W 72/0446 370/280 |
| 2019/0363867 A1* | 11/2019 | Kang | H04L 5/1469 |

OTHER PUBLICATIONS

Pauli et al., "Dynamic TDD for LTE-A and 5G", Nomor Research GmbH, Sep. 2015.

* cited by examiner

*Primary Examiner* — Moo Jeong

(57) ABSTRACT

A base station configures a TDD carrier to have a first TDD configuration for serving of a first UE and to have a second TDD configuration for serving of a second UE concurrently with the serving of the first UE. Such configuring causes the second UE to engage in an uplink communication in at least one subframe in which the first UE engages in a downlink communication, which could lead to interference issues. Therefore, the base station causes the second UE to apply uplink beamforming, so as to help minimize interference resulting from the second UE engaging in the uplink communication in the at least one subframe in which the first UE engages in the downlink communication.

16 Claims, 7 Drawing Sheets

USE OF DIFFERENT CO-EXISTING TDD CONFIGURATIONS ON A TDD CARRIER, WITH UPLINK BEAMFORMING TO HELP MINIMIZE INTERFERENCE

BACKGROUND

A cellular wireless network typically includes a number of base stations that are configured to provide wireless coverage areas in which user equipment devices (UEs) such as cell phones, tablet computers, machine-type-communication devices, tracking devices, embedded wireless modules, and/or other wirelessly equipped communication devices (whether or not user operated) can operate. Each base station could be coupled with a core network that provides connectivity with various application servers and/or transport networks, such as the public switched telephone network (PSTN) and/or the Internet for instance. With this arrangement, a UE within coverage of the cellular network could engage in air interface communication with a base station and could thereby communicate via the base station with various application servers and other entities.

Such a network could operate in accordance with a particular radio access technology (RAT), with communications from the base stations to UEs defining a downlink or forward link and communications from the UEs to the base stations defining an uplink or reverse link.

Over the years, the industry has embraced various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each coverage area could operate on a carrier (carrier frequency), which could be frequency division duplex (FDD) or time division duplex (TDD). An FDD carrier would use separate frequency channels for downlink and uplink communication, whereas a TDD carrier would use a single frequency channel multiplexed over time between downlink and uplink use. In either case, the downlink and uplink would each typically span a particular frequency bandwidth, defining within the frequency bandwidth various air interface resources for carrying communications between the base station and served UEs. Further, the air interface resources could be grouped or otherwise structured to define various logical channels for carrying control signaling and bearer and/or other traffic between the base station and UEs.

In a system that supports TDD operation, each coverage area that operates on a TDD carrier could be configured with a frame structure that has a TDD configuration (frame configuration) defining a sequence of equal-duration subframes and establishing which subframes are for downlink use and which subframes are for uplink use. In some cases, special subframes for transition between downlink and uplink operation could be provided as well.

By way of example, a coverage area could operate on a TDD carrier, and this carrier could have a TDD configuration that establishes for each subframe per frame whether the subframe is a downlink subframe (D), an uplink subframe (U), or a special subframe (S). For instance, the TDD configuration could be {D, S, U, U, D, D, S, U, U, D} or {D, S, U, D, D, D, S, U, D, D}, among other possibilities. Further, the base station that provides such coverage could broadcast a system information message that specifies details of the TDD configuration, to enable served UEs to operate accordingly.

Overview

In practice, a base station could broadcast a system information message so as to cause UE(s) served by the base station on a particular TDD carrier to all operate according to a downlink-centric TDD configuration. The downlink-centric TDD configuration might include more downlink subframes than uplink subframes, to help accommodate typically greater demand for downlink communications than for uplink communications.

Unfortunately, however, some UEs might be limited by the downlink-centric TDD configuration. For instance, an uplink-centric UE may often have more data to transmit on the uplink than data to receive on the downlink. Yet, if the TDD carrier has the downlink-centric TDD configuration for serving of this UE, there might not be sufficient uplink subframes to enable the UE to timely and/or successfully transmit the data on the uplink to the base station.

Given this, one or more of the base station's served UEs might benefit from receiving service according to the downlink-centric TDD configuration, and one or more other of the base station's served UEs might benefit from receiving service according to an uplink-centric TDD configuration. The uplink-centric TDD configuration might include more uplink subframes compared to the downlink-centric TDD configuration, and would likely have more uplink subframes than downlink subframes altogether. Therefore, the uplink-centric TDD configuration could help accommodate an uplink-centric UE's demand for more uplink communications than downlink communications.

To help provide such benefits, the base station could configure the TDD carrier such that the TDD carrier has an uplink-centric TDD configuration for serving of uplink-centric UE(s), and concurrently has a downlink-centric TDD configuration for the serving of other UE(s).

Yet, use of different co-existing TDD configurations on the TDD carrier might lead to interference issues. For example, when a base station uses different co-existing TDD configurations on the TDD carrier, at least one particular subframe of the TDD carrier may be a downlink subframe for a first UE and concurrently an uplink subframe for a second UE. As a result, the second UE might engage, in the particular subframe, in an uplink transmission that might interfere with a concurrent downlink transmission to the first UE in the particular subframe (and on the same frequency). Specifically, the first UE might inadvertently receive at least some of the uplink transmission while the first UE attempts to receive the downlink transmission from the base station. Such interference by the uplink transmission might cause the first UE to encounter higher levels of noise on the TDD carrier as the first UE attempts to receive the downlink transmission, which could in turn prevent successful receipt and/or processing of the downlink transmission by the first UE. Other interference-related issues are possible as well.

Disclosed herein is an approach that may help address these or other such issues.

In accordance with the disclosure, when a base station serves a particular UE on a TDD carrier using a first (e.g., uplink-centric) TDD configuration and concurrently serves other UE(s) on the TDD carrier using a second (e.g., downlink-centric) TDD configuration, the base station could cause the particular UE to apply uplink beamforming.

By applying uplink beamforming, the particular UE could transmit an uplink communication in a given subframe along a more direct path that is specifically focused to the base station. Such application of uplink beamforming could help decrease the likelihood of the uplink transmission being inadvertently received by another UE that is attempting to receive a downlink transmission at the same time from the base station. And even if the other UE does receive at least some of the uplink transmission in that situation, the focusing of the uplink transmission to the base station (and away from the other UE) would likely cause the other UE to receive that transmission at a reduced power, thereby reducing or minimizing the levels of noise encountered by the other UE due to receipt of that transmission. Consequently, use of the uplink beamforming by the particular UE could help increase the likelihood of successful receipt and processing of the downlink transmission by the other UE.

Therefore, the disclosed approach could enable use of different co-existing TDD configurations on a TDD carrier, while minimizing the above-described interference issues.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

Figure 1:
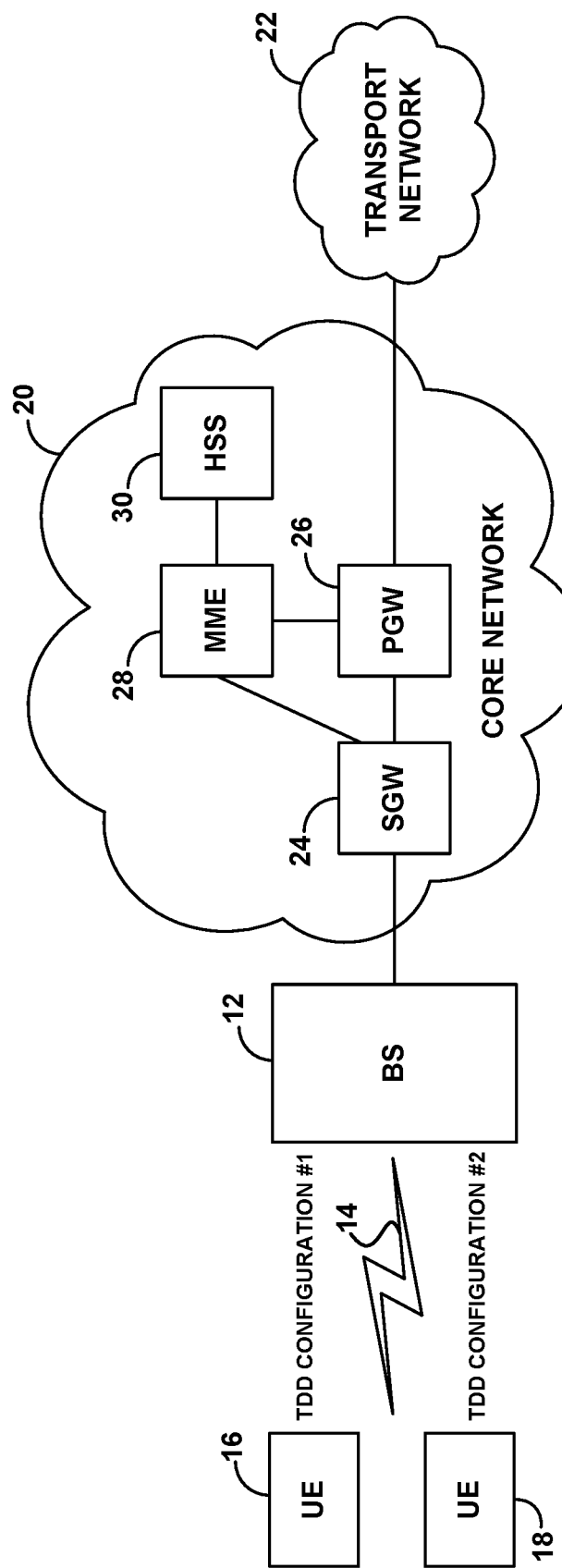
FIG. 1 is a simplified block diagram of a wireless communication system in which disclosed features can be implemented.

Referring to the drawings, as noted above, FIG. 1 is a simplified block diagram of an example wireless communication system in which various disclosed features can be implemented. It should be understood, however, that numerous variations from this and other disclosed arrangements and operations are possible. For example, elements or operations could be added, removed, combined, distributed, re-ordered, or otherwise modified. In addition, operations described as being performed by one or more entities could be implemented in various ways, such as by a processor executing instructions stored in non-transitory data storage, along with associated circuitry or other hardware, for instance.

As shown in FIG. 1, the example wireless communication system includes a representative base station 12. The base station 12 is configured to provide coverage on a TDD carrier 14, and perhaps also on one or more other carriers (not shown). Shown operating within coverage of the base station 12 are representative UEs 16 and 18. Namely, as shown, the base station 12 is serving UE 16 and UE 18 concurrently on the TDD carrier 14.

The base station 12 could be a macro base station of the type configured to provide a wide range of coverage, possibly including an antenna array mounted on a tower or other tall structure. Alternatively, the base station 12 could take other forms, such as a small cell base station, a repeater, a femtocell base station, or the like, which might be configured to provide a smaller range of coverage. The base station 12 could be configured to operate according to a 4G, 5G, or other radio access technology. For instance, the base station 12 could be an LTE evolved Node-B (eNB) or a 5G NR next generation Node-B (gNB), among other possibilities. Moreover, the base station 12 could be full-duplex capable, which could enable the base station 12 to engage in downlink and uplink communications concurrently.

The base station 12 is shown coupled with or sitting as a node on a core network 20, which could be an evolved packet core (EPC) network, next generation core (NGC) network, or another network including components supporting an applicable radio access technology and could provide connectivity with at least one transport network 22, such as the Internet.

In an example implementation as shown, the core network 20 includes a serving gateway (SGW) 24, a packet data network gateway (PGW) 26, a mobility management entity (MME) 28, and a home subscriber server (HSS) 30. In particular, the base station 12 has an interface with the SGW 24, the SGW 24 has an interface with the PGW 26, and the PGW 26 provides connectivity with the transport network 22. Further, the base station 12 has an interface with the MME 28, and the MME 28 has an interface with the SGW 24 and the HSS 30.

With this arrangement, the SGW 24 and PGW 26 cooperatively provide user-plane connectivity between the base station 12 and the transport network 22, to enable a UE served by the base station 12 to engage in communication on the transport network 22. And the MME 28 operates as a controller to carry out operations such as coordinating UE attachment and setup of user-plane bearers. Further, the HSS 30 includes or has access to a data store containing UE capabilities and service profile data (e.g., including subscription information) and can work with the MME 28 to facilitate UE authentication.

Generally, the air interface on the TDD carrier 14 could be structured to define various air-interface resources. For instance, in the time domain, the air interface could define a continuum of 10-millisecond (ms) frames, each divided into ten 1-ms subframes, and each subframe could be further divided into a number of timeslots, each additionally divided into symbol time segments. And in the frequency domain (on the shared downlink/uplink channel for TDD), the bandwidth of the TDD carrier 14 on which the base station 12 operates could be divided into subcarriers with specified subcarrier spacing on the order of 15 to 240 kHz. With this arrangement, the air interface on the TDD carrier 14 would define an array of resource elements each occupying a subcarrier and symbol time segment, and the base station 12 and UEs could communicate with each other through modulation of the subcarriers to carry data in those resource elements. Variations of this arrangement are possible as well.

Further, particular groupings of resource elements on the air interface could define physical resource blocks (PRBs). In an example implementation, each PRB could span one timeslot in the time domain and a group of subcarriers in the frequency domain. Depending on the carrier bandwidth, the air interface could thus support a certain number of such PRBs across the bandwidth of the TDD carrier 14 within each timeslot.

In addition, certain resource elements on the downlink and uplink could be reserved for particular control-channel or shared-channel communications.

For instance, on the downlink, certain resource elements per downlink subframe could be reserved to define a downlink control region for carrying control signaling such as scheduling directives and acknowledgements from the base station 12 to UEs. And other resource elements per subframe could be reserved to define a shared channel in which PRBs could carry scheduled data communications from the base station 12 to UEs.

Further, in certain subframes, a group of resource elements centered on the center frequency of the TDD carrier 14 could be reserved to carry synchronization signals that UEs could detect as a way to discover coverage of the base station 12 on the TDD carrier 14 and to establish frame timing. In practice, the base station 12's coverage could define a cell having the same physical cell identifier (PCI) on the TDD carrier 14, and the synchronization signal on the TDD carrier 14 could algorithmically map to the PCI, to facilitate UE determination of the PCI upon detecting coverage on the TDD carrier 14.

And in certain subframes, a group of resource elements also centered on the center frequency of the TDD carrier 14 could be reserved to define a broadcast-channel for carrying system information messages, such as master information block (MIB) and system information block (SIB) messages that UEs could read to obtain operational parameters such as carrier bandwidth and other information. Further, certain resource elements distributed in a predefined pattern throughout the carrier bandwidth per subframe could be reserved to carry reference signals that UEs could measure as a basis to evaluate coverage strength and quality and to provide channel estimates to facilitate precoding, beamforming, or the like.

On the uplink, on the other hand, certain resource elements per uplink subframe in TDD could be reserved to define an uplink control region for carrying control signaling such as access requests, channel-quality reports, scheduling requests, and acknowledgements, from UEs to the base station 12. And other resource elements per subframe could be reserved to define a shared channel in which PRBs could carry scheduled data communications from UEs to the base station 12. Further, still other resources on the uplink could be reserved for other purposes as well, such as for carrying uplink reference signals or the like.

Yet further, to connect with the base station 12 on a selected carrier, the UE could engage in random access signaling with the base station 12 on the carrier, and the UE could then engage in Radio Resource Control (RRC) configuration signaling with the base station to establish an RRC connection with the base station 12 on the carrier. Establishing this connection puts the UE into an RRC-connected mode.

Once the UE is connected with the base station 12, the UE could then transmit to the base station 12 an attach request if appropriate, which the base station 12 could forward to the MME 28 for processing. And after working with the HSS 30 to authenticate the UE, the MME 28 could coordinate setup for the UE of one or more user-plane bearers between the base station 12 and the PGW 26, to enable the UE to engage in communication on the transport network 22. Further, the base station 12 could establish for the UE one or more corresponding radio bearers and an associated context record, and the base station 12 could receive from the UE and/or the HSS 30 (via the MME 28) a set of capabilities and profile data for the UE and could store that data in the context record for reference while serving the UE.

The base station 12 could then serve the UE with data communications on the selected carrier.

For instance, when data arrives at the base station 12 for transmission to the UE, the base station 12 could allocate one or more PRBs in a downlink subframe for use to transmit at least a portion of the data, defining a transport block, to the UE. The base station 12 could then transmit to the UE in the control region of that subframe a Downlink Control Information (DCI) message that designates the PRBs, and the base station 12 could accordingly transmit the transport block to the UE in those designated PRBs. And when the UE has data to transmit to the base station 12 (e.g., for transmission on the transport network), the UE could transmit to the base station 12 a scheduling request that carries with it a buffer status report (BSR) indicating how much data the UE has buffered for transmission. And in response, the base station 12 could allocate one or more PRBs in an upcoming uplink subframe for carrying a transport block of that data from the UE and could transmit to the UE a DCI message that designates those upcoming PRBs. The UE could then accordingly transmit the transport block to the base station 12 in the designated PRBs.

In a system arranged as described, UEs 16 and 18 could connect with base station 12, and base station 12 could in turn serve both UE 16 and UE 18 concurrently on the same TDD carrier 14 (e.g., on the same center frequency and bandwidth) as noted above. FIG. 1 shows that such serving could involve the base station 12 serving UE 16 on the TDD carrier 14 according to one TDD configuration, and concurrently serving UE 18 on the TDD carrier 14 according to another TDD configuration.

Figure 2:
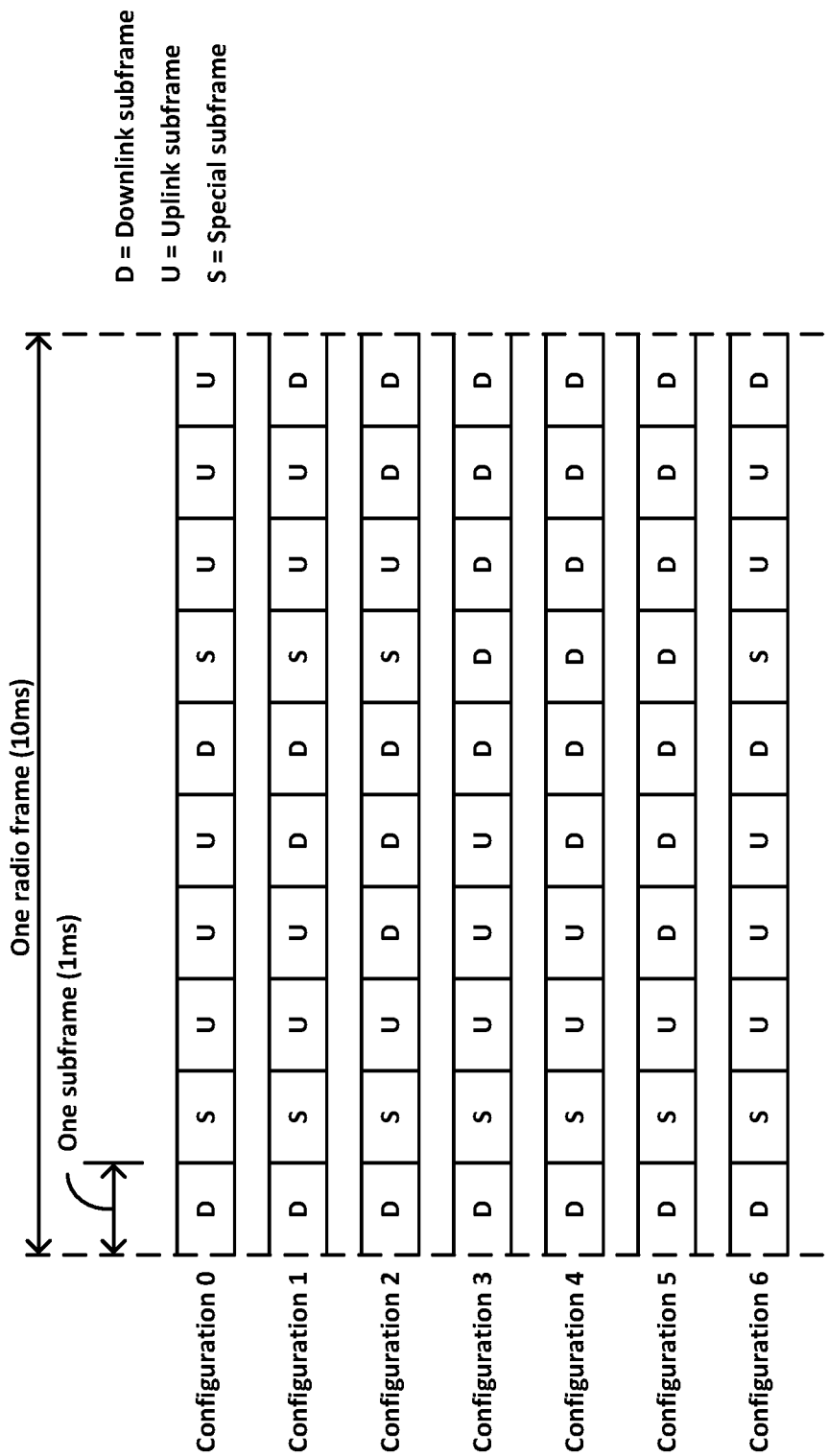
FIG. 2 is an illustration of various TDD configurations.

In practice, a RAT could define various TDD configurations, which might differ from each other in terms of which subframes are set aside for downlink communication and which subframes are set aside for uplink communication. FIG. 2 depicts examples of such TDD configurations, which are labeled as configurations 0 through 6. For instance, FIG. 2 shows that configuration 2 is {D, S, U, D, D, D, S, U, D, D}, and that configuration 6 is {D, S, U, U, U, D, S, U, U, D}.

Given this, the base station 12 could be configured to operate with one or more of these TDD configurations, and could broadcast a system information message that specifies a select TDD configuration for serving of UE(s) on the TDD carrier 14. A UE within coverage of the base station 12 could determine the select TDD configuration based on that broadcast message, and could then operate in accordance with that TDD configuration.

For example, the base station 12 could broadcast a SIB message that specifies a TDD configuration (e.g., a TDD configuration number) for serving of UE(s) on the TDD carrier 14. Thus, UE 16 could read that SIB message to determine the TDD configuration for serving of the UE 16 on the TDD carrier 14, and UE 18 could read that SIB message to determine the TDD configuration for serving of the UE 18 on the TDD carrier 14. In turn, UEs 16 and 18 could then respectively operate in accordance with the same TDD configuration while the base station 12 concurrently serves UEs 16 and 18 on the TDD carrier 14.

In line with the discussion above, the broadcasted system information message might specify a downlink-centric TDD configuration and thus might cause UEs 16 and 18 to respectively operate in accordance with that downlink-centric TDD configuration (e.g., configuration 2 shown in FIG. 2). Yet, UE 18 might benefit from being served by the base station 12 according to an uplink-centric TDD configuration. Therefore, the base station 12 might change the TDD configuration that the base station 12 uses to serve the UE 18 on the TDD carrier, such as to an uplink-centric TDD configuration (e.g., configuration 6 shown in FIG. 2) that is different from the downlink-centric TDD configuration specified in the broadcasted system information message.

In a more specific example, the base station 12 could a make a determination that UE 18 is engaging or will engage in a predefined threshold high extent of uplink communication, and the base station 12 could responsively reconfigure the TDD carrier 14 to have an uplink-centric TDD configuration for serving of this UE 18.

The base station 12 could make such a determination in various ways.

For example, the base station 12 could be configured with or otherwise have access to information indicating the predefined threshold. Also, the base station 12 could refer to a BSR received from the UE 18, so as to determine the extent of data the UE 18 has buffered for transmission. As such, the base station 12 could make a determination of whether that determined extent is at or above the predefined threshold.

In another example, the base station 12 could determine the type of communication that the UE 18 is engaged in or will engage in based on (i) the UE 18's recent communication history, (ii) the UE 18's established bearer type, and/or (iii) deep packet inspection or the like, any one or more of which might show that the UE is engaged in a type of communication that is or tends to be uplink-centric. As such, the base station 12 could make the determination at issue based on the type of communication that the UE 18 is engaged in or will engage in. Other examples are also possible.

Further, to facilitate the reconfiguring of the TDD carrier 14 as described, the base station 12 could transmit, to the UE 18, an RRC connection configuration message specifying the uplink-centric TDD configuration. The UE 18 could read that RRC connection configuration message to determine the uplink-centric TDD configuration for serving of the UE 18 on the TDD carrier 14. In turn, the UE 18 could then operate in accordance with that uplink-centric TDD configuration while being served by the base station 12 on the TDD carrier 14. The UE 18 could do so while other UE(s) being served on the TDD carrier 14 (e.g., UE 16) continue to operate according to the TDD configuration specified in the broadcasted system information message.

Figure 3:
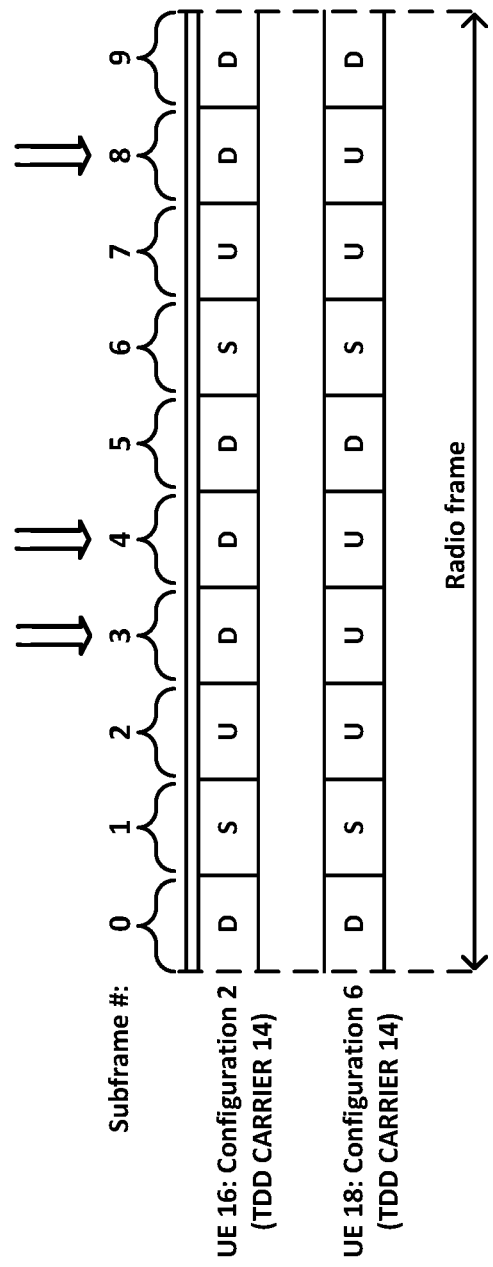
FIG. 3 is an illustration of different co-existing TDD configurations on a TDD carrier.

In line with the discussion above, use of different co-existing TDD configurations on the TDD carrier 14 might lead to interference issues. FIG. 3 helps illustrates these interference issues. As shown in FIG. 3, base station 12 configured the TDD carrier 14 to have a TDD configuration 2 (also shown in FIG. 2) for serving of UE 16, and to have TDD configuration 6 (also shown in FIG. 2) for serving of UE 18 concurrently with the serving of UE 16 on the TDD carrier 14. In this arrangement, subframe 3 is a downlink subframe for UE 16 and concurrently an uplink subframe for UE 18, subframe 4 is a downlink subframe for UE 16 and concurrently an uplink subframe for UE 18, and subframe 8 is a downlink subframe for UE 16 and concurrently an uplink subframe for UE 18. As a result, the UE 18 might engage in an uplink communication in subframe 3 that may interfere with a concurrent downlink communication to UE 16 in subframe 3, might engage in an uplink communication in subframe 4 that may interfere with a concurrent downlink communication to UE 16 in subframe 4, and/or might engage in an uplink communication in subframe 8 that may interfere with a concurrent downlink communication to UE 16 in subframe 8. As discussed, such interference might prevent successful receipt and/or processing of a downlink communication by the UE 16.

To help overcome such interference issues, base station 12 could cause UE 18 to apply uplink beamforming at least in a situation where a particular subframe of TDD carrier 14 is an uplink subframe for the UE 18 and concurrently a downlink subframe for UE 16.

Generally, the UE 18 could apply uplink beamforming to effectively provide an uplink transmission along a more direct path that is specifically focused to the base station 12. To facilitate this, the UE 18 could be configured with equipment and associated control logic that focuses the uplink transmission in the direction of the base station. For example, the UE 18 could be equipped with a smart antenna (e.g., a phased array antenna) and possibly other equipment, and could set amplitude and phase of individual antenna elements so that waveforms of signals transmitted from various antenna elements constructively combine in the direction of the base station.

Further, base station 12 could cause UE 18 to apply uplink beamforming in various ways. For example, the base station 12 could transmit, to the UE 18, a DCI message that schedules an uplink communication in a particular subframe and that directs the UE 18 to apply uplink beamforming for this uplink communication. In some cases, the base station 12 could transmit such a DCI message to the UE 18 in response to determining that a downlink communication is scheduled for transmission to another UE (e.g., UE 16) in that particular subframe. In this way, the DCI message could specify a subframe susceptible to interference issues, so that the UE 18 can apply uplink beamforming to help overcome those issues. In other examples, the base station 12 could transmit, to the UE 18, a DCI message that directs the UE 18 to use uplink beamforming for uplink communications as a general matter. Other examples are also possible.

Furthermore, the base station could cause a UE to apply uplink beamforming per the present disclosure in response to one or more triggers. Various such triggers are possible.

For example, the base station 12 could configure the TDD carrier 14 to have a particular TDD configuration (e.g., configuration 6) for serving of the UE 18, and the base station 12 could respond to such configuring by causing UE 18 to apply uplink beamforming.

In another example, the base station 12 could configure the TDD carrier 14 to have a TDD configuration for serving of the UE 18 that is different from a TDD configuration used for serving of the UE 16, and the base station 12 could respond to such configuring by causing UE 18 to apply uplink beamforming.

In yet another example, the base station 12 could cause UE 18 to apply uplink beamforming in response to making a determination that UE 18 is engaging or will engage in a predefined threshold high extent of uplink communication. The base station 12 could make such a determination as described above.

In yet another example, the base station 12 could cause UE 18 to apply uplink beamforming in response to making a determination that UE 18 supports uplink beamforming. The base station 12 could make such a determination in various ways. For example, the UE 18 could support uplink beamforming if the UE 18 is configured with the capability to use uplink beamforming, such as by including equipment (e.g., a smart antenna) and associated control logic to enable the UE 18 to apply uplink beamforming as described. In some cases, the UE 18's support of uplink beamforming might also be conditioned upon whether the UE 18 subscribes to a service plan that provides for or otherwise permits use of uplink beamforming by the UE 18. Given this, the base station 12 could make the determination based on capability information and/or subscription information indicating that the UE 18 supports uplink beamforming. In practice, the base station 12 could obtain such capability and/or subscription information from the HSS 30, from a context record associated with the UE 18, and/or directly from the UE 18, among other options. Other examples are also possible.

In some implementations, the base station 12 might use different co-existing TDD configurations on the TDD carrier 14 as described, but only if the base station 12 determines that the UE 18 supports uplink beamforming. Namely, the base station 12 could effectively ensure that UE 18 supports uplink beamforming before configuring the TDD carrier 14 to have a different TDD configuration for serving of that UE 18, so that the base station 12 could cause the UE 18 to apply uplink beamforming in order to help minimize interference during such serving. For example, the base station 12 could determine both that UE 18 is engaging or will engage in a predefined threshold high extent of uplink communication and that the UE 18 supports uplink beamforming, and only then the base station 12 would responsively configure the TDD carrier 14 to have a TDD configuration for serving of the UE 18 that is different from a TDD configuration used for other UE(s) operating on the TDD carrier 14. Other examples are also possible.

Yet further, the base station 12 could rely on various triggers as basis to stop use of different co-existing TDD configurations on the TDD carrier 14 and/or to cause a UE to stop applying uplink beamforming. For example, in a situation where the TDD carrier 14 has an uplink-centric TDD configuration for serving of UE 18 as described, the base station 12 could make a determination that the UE 18 is no longer engaging or will stop engaging in the predefined threshold high extent of uplink communication. And the base station 12 could respond to such a determination by reconfiguring the TDD carrier 14 to have another (e.g., downlink-centric) TDD configuration for serving of the UE 18, such as one established for other UE(s) operating on the TDD carrier 14 (e.g., specified in the broadcasted system information message). Additionally or alternatively, the base station 12 could respond to such a determination by causing the UE 18 to stop applying the uplink beamforming. The base station 12 could do so by transmitting, to the UE 18, another DCI message that directs the UE 18 to not apply uplink beamforming for a certain uplink communication or that directs the UE 18 to stop applying uplink beamforming altogether. Other examples are also possible.

Figure 4:
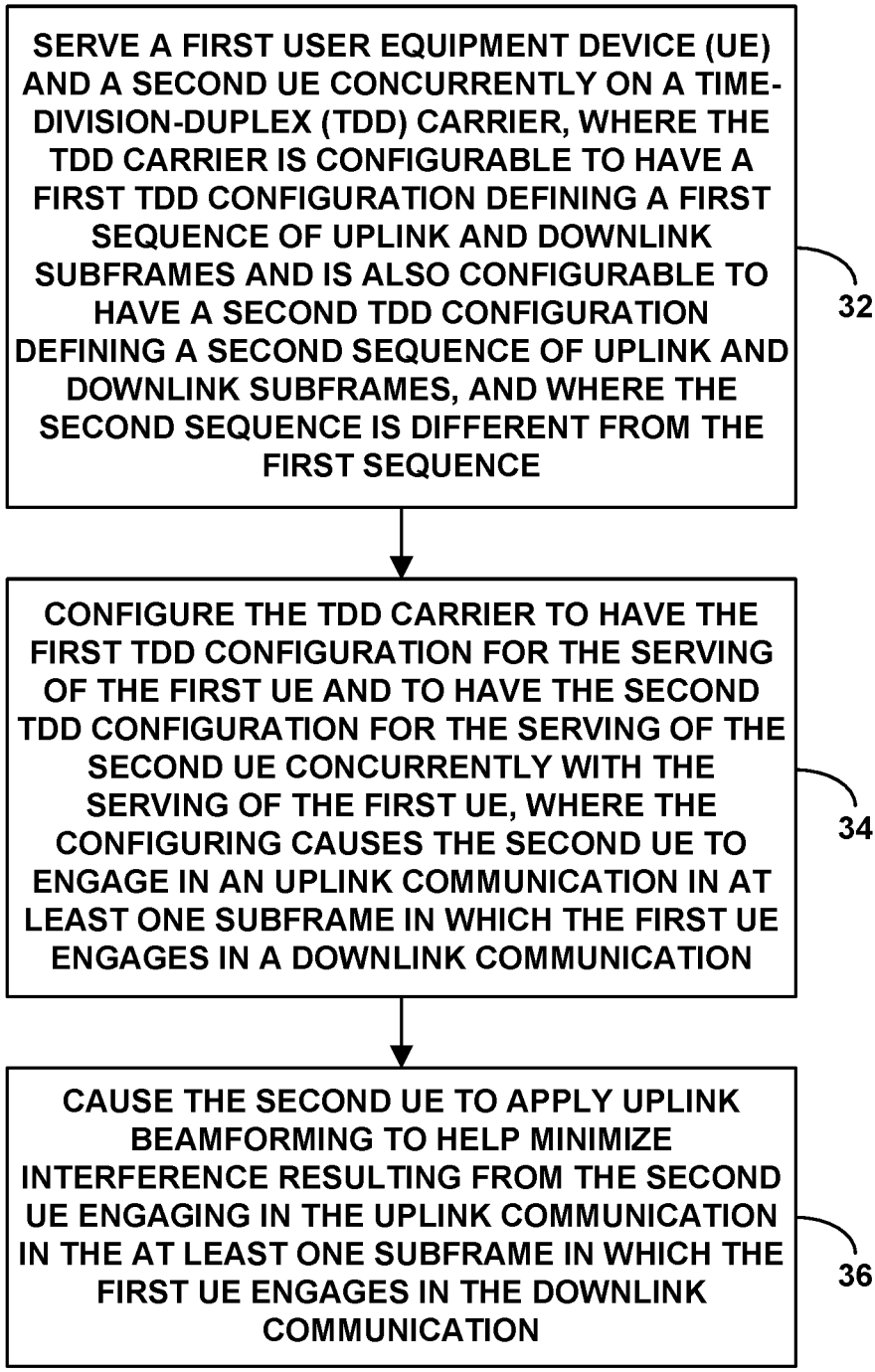
FIG. 4 is a flow chart depicting an example method in accordance with the present disclosure.

FIG. 4 is next a flow chart depicting a method that could be carried out in accordance with this disclosure.

As shown in FIG. 4, at block 32, the method includes serving a first UE and a second UE concurrently on a TDD carrier. The TDD carrier is configurable to have a first TDD configuration defining a first sequence of uplink and downlink subframes and is also configurable to have a second TDD configuration defining a second sequence of uplink and downlink subframes, the second sequence being different from the first sequence.

Also, at block 34, the method includes configuring the TDD carrier to have the first TDD configuration for the serving of the first UE and to have the second TDD configuration for the serving of the second UE concurrently with the serving of the first UE. Such configuring causes the second UE to engage in an uplink communication in at least one subframe in which the first UE engages in a downlink communication.

Further, at block 36, the method includes causing the second UE to apply uplink beamforming to help minimize interference resulting from the second UE engaging in the uplink communication in the at least one subframe in which the first UE engages in the downlink communication.

Figure 5:
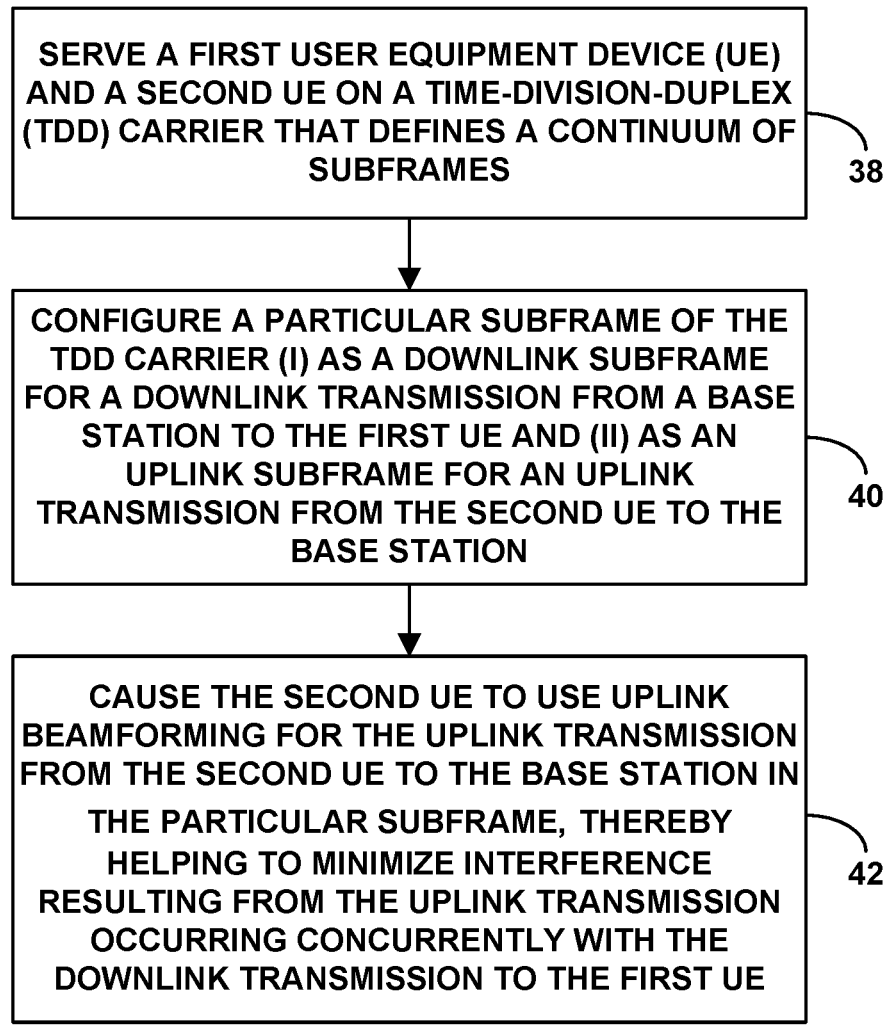
FIG. 5 is another flow chart depicting an example method in accordance with the present disclosure.

FIG. 5 is a flow chart depicting another method that could be carried out in accordance with this disclosure.

As shown in FIG. 5, at block 38, the method includes serving a first UE and a second UE on a TDD carrier that defines a continuum of subframes. Also, at block 40, the method includes configuring a particular subframe of the TDD carrier (i) as a downlink subframe for a downlink transmission from a base station to the first UE and (ii) as an uplink subframe for an uplink transmission from the second UE to the base station. Further, at block 42, the method includes causing the second UE to use uplink beamforming for the uplink transmission from the second UE to the base station in the particular subframe, thereby helping to minimize interference resulting from the uplink transmission occurring concurrently with the downlink transmission to the first UE.

Figure 6:
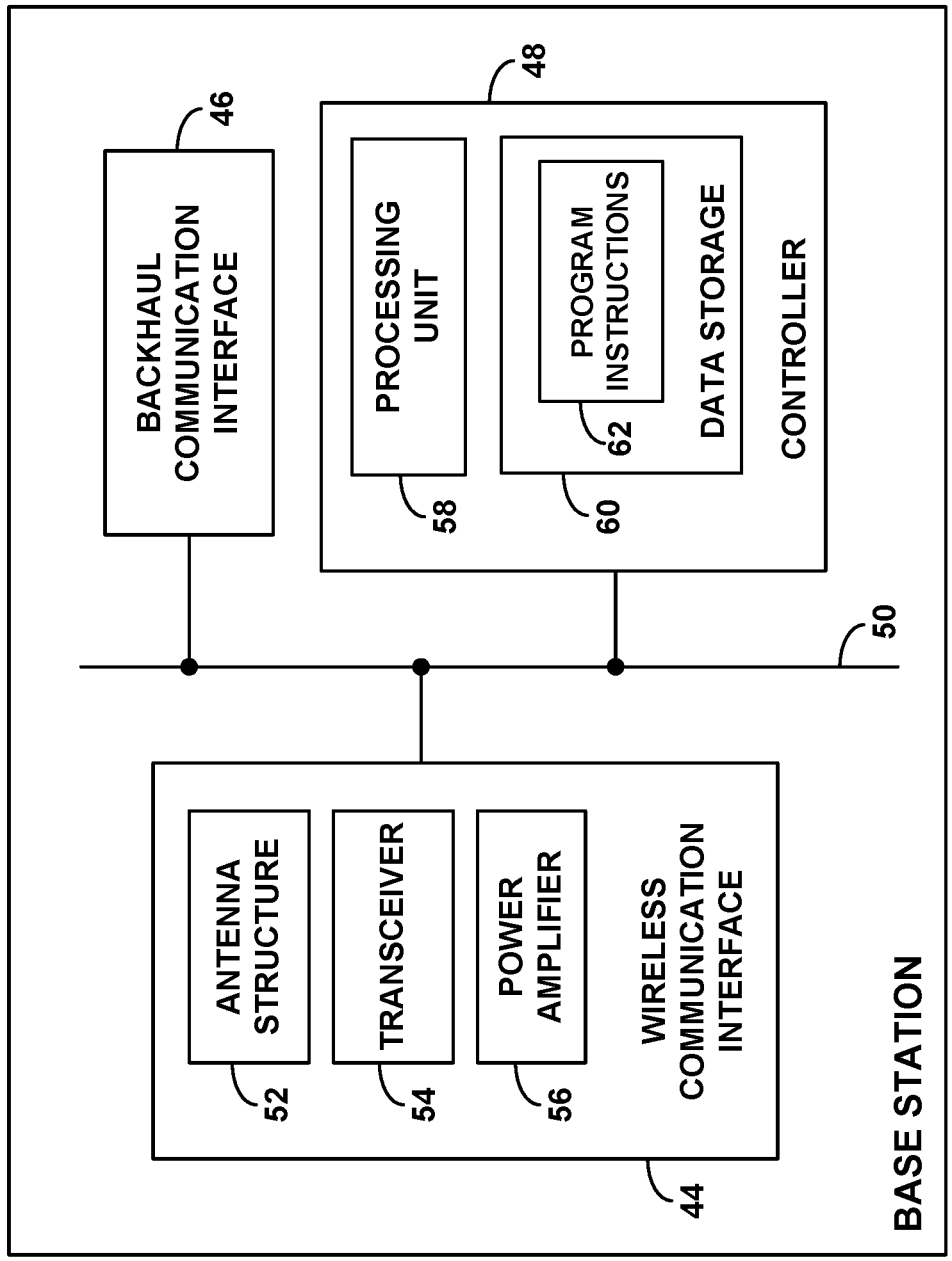
FIG. 6 is a simplified block diagram of an example base station operable in accordance with the disclosure.

FIG. 6 is next a simplified block diagram of an example base station operable in line with the discussion above. As shown, the example base station includes a wireless communication interface 44, a backhaul communication interface 46, and a controller 48, which could be integrated or communicatively linked together by a system bus, network, or other connection mechanism 50 and/or could be integrated together or distributed in various ways.

The wireless communication interface 44 could include an antenna structure (e.g., a MIMO antenna array, possibly a massive-MIMO array) 52, a transceiver 54, and a power amplifier 56, among one or more other RF components, to cooperatively facilitate air interface communication with a UE served by the base station. Thus, through the wireless communication interface including the antenna structure, the base station could be configured to provide a coverage area on at least one TDD carrier and possibly on other carrier(s) as well.

The backhaul communication interface 46 could then include a wireless and/or wireless network communication module configured to support communication on a core access network such as that shown in FIG. 1 for instance.

And the controller 48 could then be configured to carry out various base station operations described herein. For instance, the controller 48 could comprise a processing unit 58 including one or more processors (e.g., general purpose microprocessors and/or dedicated processing units), non-transitory data storage 60 (e.g., one or more volatile and/or non-volatile storage components, such as magnetic, optical or flash storage), and program instructions 62 stored in the non-transitory data storage 60 and executable by the processing unit 58 to cause the base station to carry out the operations.

Figure 7:
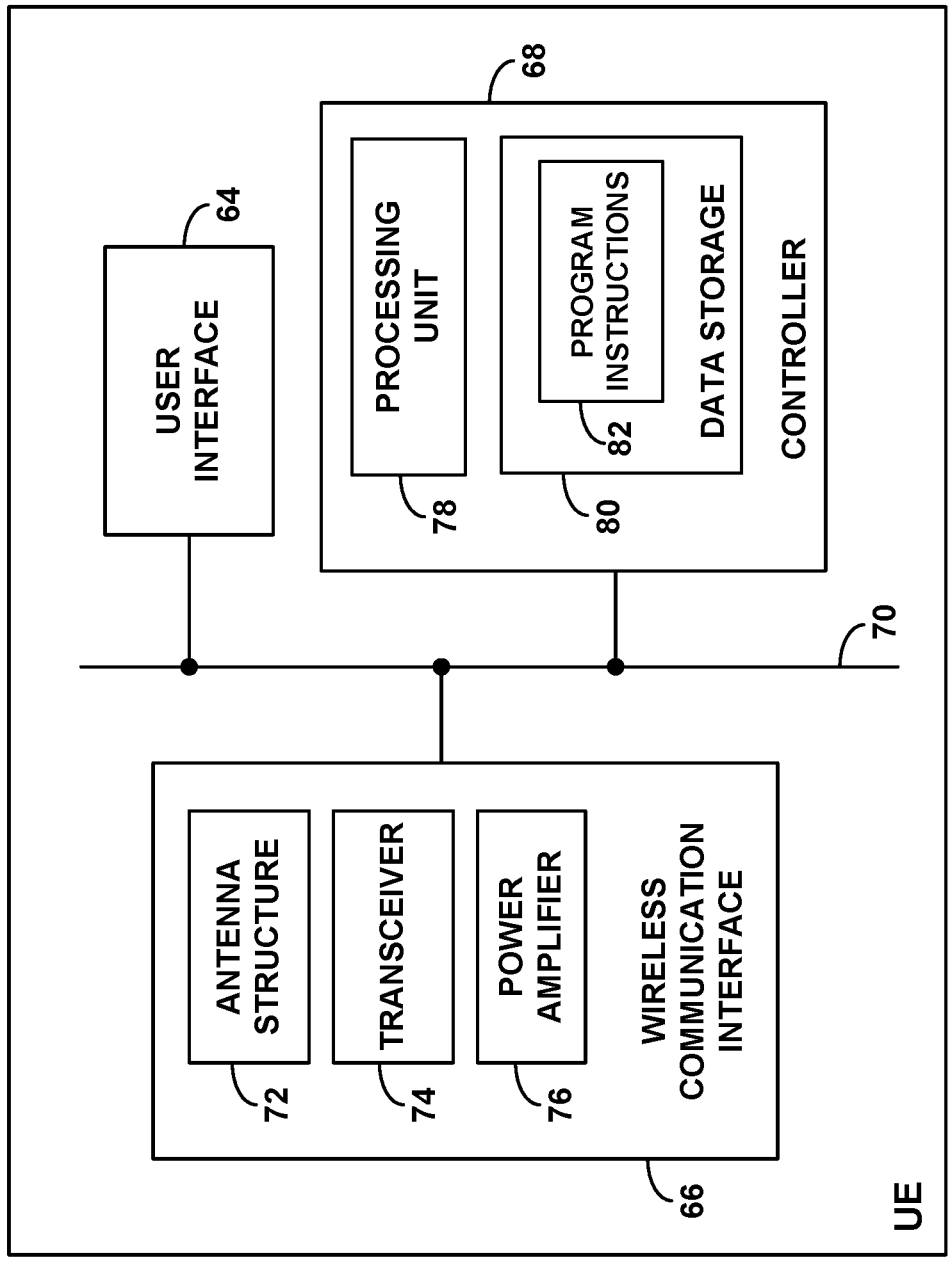
FIG. 7 is a simplified block diagram of an example UE operable in accordance with this disclosure.

Finally, FIG. 7 is a simplified block diagram of an example UE operable in line with the discussion above. A shown, the example UE includes a user interface 64, a wireless communication interface 66, and a controller 68, all of which may be communicatively linked together by a system bus, network, or other connection mechanism 70 and/or could be integrated together or distributed in various ways.

In this example arrangement, the user interface 64 (which might be omitted if the UE is not user operated, such as if the UE is not user operated) could include input and output components that facilitate user interaction with the UE. The wireless communication interface 66 could then include an antenna structure 72, a transceiver 74, and a power amplifier 76, among one or more other RF components, through which the UE is configured to engage in air interface communication.

And the controller 68 could comprise control logic to cause the UE to carry out particular UE operations described herein. For instance, the controller 68 could include a processing unit 78 including one or more processors (e.g., general purpose microprocessors and/or dedicated processing units), non-transitory data storage 80 (e.g., one or more volatile and/or non-volatile storage components, such as magnetic, optical, or flash storage), and program instructions 82 stored in the non-transitory data storage 82 and executable by the processing unit 78 to cause the UE to carry out the operations.

Exemplary embodiments have been described above. Those skilled in the art will understand, however, that changes and modifications may be made to these embodiments without departing from the true scope and spirit of the invention.

We claim:

1. A method comprising:
    serving, by a base station, a first user equipment device (UE) and a second UE concurrently on a time-division-duplex (TDD) carrier, wherein the TDD carrier is configurable by the base station to have a first TDD configuration defining a first sequence of uplink and downlink subframes and is also configurable by the base station to have a second TDD configuration defining a second sequence of uplink and downlink subframes, and wherein the second sequence is different from the first sequence;
    making a determination, by the base station, that the second UE supports uplink beamforming, wherein the base station makes the determination based on information selected from a group consisting of (i) capability information indicating that the second UE supports the uplink beamforming and (ii) subscription information indicating that the second UE supports the uplink beamforming;
    responsive to at least making the determination, configuring, by the base station, the TDD carrier to have the first TDD configuration for the serving of the first UE and to have the second TDD configuration for the serving of the second UE concurrently with the serving of the first UE, wherein the configuring causes the second UE to engage in an uplink communication in at least one subframe in which the first UE engages in a downlink communication; and
    responsive to at least making the determination, causing, by the base station, the second UE to apply the uplink beamforming to help minimize interference resulting from the second UE engaging in the uplink communication in the at least one subframe in which the first UE engages in the downlink communication.

2. The method of claim 1, wherein causing the second UE to apply the uplink beamforming is responsive to the configuring.

3. The method of claim 1, wherein, before configuring of the TDD carrier to have the second TDD configuration for the serving of the second UE, the TDD carrier has the first TDD configuration for both the serving of the first UE and the serving of the second UE.

4. The method of claim 1, wherein the determination is a first determination, and wherein the second TDD configuration has more uplink subframes than the first TDD configuration, the method further comprising:
    making a second determination, by the base station, that the second UE is engaging or will engage in a predefined threshold high extent of uplink communication, and
    wherein configuring the TDD carrier to have the second TDD configuration for the serving of the second UE and causing the second UE to apply the uplink beamforming are further responsive to at least making the second determination.

5. The method of claim 4, further comprising:
    making a further determination, by the base station, that the second UE is no longer engaging or will stop engaging in the predefined threshold high extent of uplink communication; and
    in response to making the further determination, the base station (i) reconfiguring the TDD carrier to have the first TDD configuration both for the serving of the first UE and for the serving of the second UE, and (ii) causing the second UE to stop applying the uplink beamforming.

6. The method of claim 1, wherein the configuring comprises transmitting, to the second UE, a radio-resource-control (RRC) connection configuration message that specifies the second TDD configuration for the serving of the second UE.

7. The method of claim 1, wherein causing the second UE to apply the uplink beamforming comprises transmitting, to the second UE, a downlink control information (DCI) message that directs the second UE to apply the uplink beamforming.

8. The method of claim 7, wherein the DCI message directs the second UE to apply the uplink beamforming for the uplink communication in the at least one subframe.

9. A method comprising:
    serving, by a base station, a first user equipment device (UE) and a second UE on a time-division-duplex (TDD) carrier that defines a continuum of subframes;
    making a determination, by the base station, that the second UE supports uplink beamforming, wherein the base station makes the determination based on information selected from a group consisting of (i) capability information indicating that the second UE supports the uplink beamforming and (ii) subscription information indicating that the second UE supports the uplink beamforming;
    responsive to at least making the determination, configuring, by the base station, a particular subframe of the TDD carrier (i) as a downlink subframe for a downlink transmission from the base station to the first UE and (ii) as an uplink subframe for an uplink transmission from the second UE to the base station; and responsive to at least making the determination, causing, by the base station, the second UE to use the uplink beamforming for the uplink transmission from the second UE to the base station in the particular subframe, thereby helping to minimize interference resulting from the uplink transmission occurring concurrently with the downlink transmission to the first UE.

10. The method of claim 9, wherein the configuring causes the uplink transmission from the second UE to the base station to occur concurrently with the downlink transmission from the base station to the first UE.

11. The method of claim 9, wherein causing the second UE to use the uplink beamforming is responsive to the configuring.

12. The method of claim 9, wherein, before configuring of the particular subframe as the uplink subframe for the uplink transmission from the second UE to the base station, the particular subframe is configured as a downlink subframe for a downlink transmission from the base station to the second UE.

13. The method of claim 12, wherein the determination is a first determination, the method further comprising:
making a second determination, by the base station, that the second UE is engaging or will engage in a predefined threshold high extent of uplink communication, and
wherein configuring the particular subframe as the uplink subframe for the uplink transmission from the second UE to the base station and causing the second UE to use uplink beamforming for the uplink transmission are further responsive to at least making the second determination.

14. The method of claim 13, further comprising:
making a further determination, by the base station, that the second UE is no longer engaging or will stop engaging in the predefined threshold high extent of uplink communication; and
in response to making the further determination, the base station (i) reconfiguring the particular subframe as the downlink subframe for the downlink transmission from the base station to the second UE, and (ii) causing the second UE to stop using the uplink beamforming.

15. The method of claim 9,
wherein the configuring comprises transmitting, to the second UE, a radio-resource-control (RRC) connection configuration message designating the particular subframe as the uplink subframe for the uplink transmission from the second UE to the base station, and
wherein causing the second UE to use the uplink beamforming comprises transmitting, to the second UE, a downlink control information (DCI) message that directs the second UE to use the uplink beamforming for the uplink transmission from the second UE to the base station in the particular subframe.

16. A base station comprising:
an antenna structure configured to provide an air interface through which the base station serves a first user equipment device (UE) and a second UE on a time-division-duplex (TDD) carrier; and
a controller configured to carry out operations including:
making a determination that the second UE supports uplink beamforming, wherein the determination is made based on information selected from a group consisting of (i) capability information indicating that the second UE supports the uplink beamforming and (ii) subscription information indicating that the second UE supports the uplink beamforming;
responsive to at least making the determination, configuring a particular subframe of the TDD carrier (i) as a downlink subframe for a downlink transmission from the base station to the first UE and (ii) as an uplink subframe for an uplink transmission from the second UE to the base station; and
responsive to at least making the determination, causing the second UE to use the uplink beamforming for the uplink transmission from the second UE to the base station in the particular subframe, thereby helping to minimize interference resulting from the uplink transmission occurring concurrently with the downlink transmission to the first UE.

* * * * *